(12) United States Patent
Yip

(10) Patent No.: US 7,206,170 B2
(45) Date of Patent: Apr. 17, 2007

(54) THIN FILM SERVO HEAD APPARATUS WITH CANTED SERVO GAPS

(75) Inventor: Yung Yip, Afton, MN (US)

(73) Assignee: Imetion Corp., Oakdale, MN (US)

( * ) Notice: Subject to any disclaimer, the term of this patent is extended or adjusted under 35 U.S.C. 154(b) by 437 days.

(21) Appl. No.: 10/848,843

(22) Filed: May 19, 2004

(65) Prior Publication Data
US 2005/0259364 A1 Nov. 24, 2005

(51) Int. Cl.
G11B 5/29 (2006.01)
(52) U.S. Cl. .................... 360/241.1; 360/121
(58) Field of Classification Search ............ 360/121, 360/241.1
See application file for complete search history.

(56) References Cited

U.S. PATENT DOCUMENTS

| | | | |
|---|---|---|---|
| 3,665,118 A | 5/1972 | Cooper, Jr. | |
| 3,686,649 A | 8/1972 | Behr | |
| 4,007,493 A | 2/1977 | Behr et al. | |
| 4,149,198 A | 4/1979 | Behr et al. | |
| 4,321,634 A | 3/1982 | Lehureau | |
| 4,347,534 A | 8/1982 | Kimura | |
| 4,454,549 A | 6/1984 | Pennington | |
| 4,472,750 A | 9/1984 | Klumpp et al. | |
| 4,498,129 A | 2/1985 | Velazquez | |
| 4,531,170 A | 7/1985 | Takei et al. | |
| 4,549,232 A | 10/1985 | Axmear et al. | |
| 4,586,094 A | 4/1986 | Chambors et al. | |
| 4,587,579 A | 5/1986 | Cocke et al. | |
| 4,598,327 A | 7/1986 | Jen et al. | |
| 4,685,005 A | 8/1987 | Fields, Jr. | |
| 4,962,437 A * | 10/1990 | Wilcox .................... | 360/234.7 |
| 4,967,301 A | 10/1990 | Lopez et al. | |
| 5,003,412 A | 3/1991 | Bizjak et al. | |
| 5,021,910 A | 6/1991 | Murakami | |
| 5,055,951 A | 10/1991 | Behr | |
| 5,119,248 A | 6/1992 | Bizjak et al. | |
| 5,132,861 A | 7/1992 | Behr et al. | |
| 5,198,948 A * | 3/1993 | Stover et al. ............... | 360/124 |
| 5,223,994 A | 6/1993 | Behr et al. | |
| 5,293,281 A | 3/1994 | Behr et al. | |
| 5,461,528 A * | 10/1995 | Keel et al. .................. | 360/124 |
| 5,523,904 A * | 6/1996 | Saliba ..................... | 360/77.12 |
| 5,689,384 A | 11/1997 | Albrecht et al. | |
| 5,930,065 A | 7/1999 | Albrecht et al. | |
| 5,998,316 A | 12/1999 | Seto et al. | |
| 6,021,013 A | 2/2000 | Albrecht et al. | |
| 6,154,330 A | 11/2000 | Nakagawa | |
| 6,169,640 B1 | 1/2001 | Fasen | |
| 6,222,698 B1 * | 4/2001 | Barndt et al. ................. | 360/76 |
| 6,282,051 B1 * | 8/2001 | Albrecht et al. ............. | 360/75 |
| 6,331,920 B1 * | 12/2001 | Albrecht et al. ............. | 360/63 |
| 6,469,854 B1 | 10/2002 | Gill et al. | |
| 6,700,729 B1 * | 3/2004 | Beck et al. ................... | 360/76 |
| 6,898,045 B2 * | 5/2005 | Beck et al. ................... | 360/76 |
| 6,947,247 B2 * | 9/2005 | Schwarz et al. ............. | 360/76 |
| 7,106,544 B2 * | 9/2006 | Dugas et al. ................. | 360/75 |

* cited by examiner

*Primary Examiner*—Jefferson Evans
(74) *Attorney, Agent, or Firm*—Eric D. Levinson

(57) ABSTRACT

A thin film servo head apparatus is described that provides verification of time-based servo marks on a magnetic tape. The thin film servo head apparatus includes a plurality of thin film servo heads formed in a substrate. The substrate is canted such that servo gaps included in each of the thin film servo heads are substantially parallel to the time-based servo marks. Thin film servo heads eliminate the high labor, low yield machining process associated with conventional ferrite composite servo heads. Thin film servo heads may be fabricated in bulk on substrate wafers to reduce manufacturing time and cost. The invention described herein enables thin film servo heads to be used with time-based servo markings by defining a servo gap spacing such that when the substrate is canted, the servo gaps of the thin film servo heads substantially align with the time-based servo markings.

18 Claims, 10 Drawing Sheets

THIN FILM SERVO HEAD APPARATUS WITH CANTED SERVO GAPS

TECHNICAL FIELD

The invention relates to servo heads for use with magnetic storage media and, more particularly, thin film servo heads.

BACKGROUND

Data storage media are commonly used for storage and retrieval of data, and come in many forms, such as magnetic tape, magnetic disks, optical tape, optical disks, holographic disks or cards, and the like. Magnetic tape media remains economical for storing large amounts of data. For example, magnetic tape cartridges, or large spools of magnetic tape, are often used to back up data in large computing centers. Magnetic tape cartridges also find application in the backup of data stored on smaller computers such as desktop or notebook computers.

In magnetic media, data is typically stored as magnetic signals that are magnetically recorded on the medium surface. The data stored on the medium is typically organized along "data tracks," and transducer heads are positioned relative to the data tracks to write data to the tracks or read data from the tracks. A typical magnetic storage medium, such as magnetic tape, typically includes several data tracks in a data band. Optical media, holographic media, and other media formats can also make use of data tracks.

Servo patterns refer to signals or other recorded marks on the medium that are used for tracking purposes. In other words, servo patterns are recorded on the medium to provide reference points relative to the data tracks. A servo controller interprets detected servo patterns and generates position error signals. The position error signals are used to adjust the lateral distance of the transducer head relative to the data tracks so that the transducer head is properly positioned along the data tracks for effective reading and/or writing of the data to the data tracks.

With some data storage media, such as magnetic tape, the servo patterns are stored in specialized tracks on the medium, called "servo tracks." Servo tracks serve as references for the servo controller. Servo tracks typically hold no data except for information that is useful to the servo controller to identify positioning of a transducer head relative to the surface of the medium. A plurality of servo tracks may be defined in a servo band. Some magnetic media include a plurality of servo bands, with data tracks being located between the servo bands.

The servo patterns recorded in the servo tracks may be sensed by one or more servo heads. For example, servo heads may be dedicated heads that read only servo patterns in the servo tracks. Alternatively, servo heads may be integrated with a read/write head. In any case, once a particular servo track is located by the servo head, one or more data tracks can be located on the medium according to the data track's known displacement from the servo track. The servo controller receives detected servo signals from the servo heads, and generates position error signals, which are used to adjust positioning of a read/write head relative to the data tracks.

Time-based servo techniques refer to servo techniques that make use of time variables. Time-based servo techniques are particularly effective for magnetic tape, which typically feeds past transducer heads at a constant velocity. For example, N-shaped servo markings, servo markings such as "<<< >>>" or "//// \\\\," or the like, have been developed for time-based servo techniques. Such markings are typically formed in a servo band of the magnetic tape and may define a plurality of servo tracks in the servo band.

When time-based servo techniques are used, the time offset between detection of two or more servo marks can be translated into a position error signal, which defines a lateral distance of the transducer head relative to a data track. For example, given a constant velocity of magnetic tape formed with marking "/ \", the time between detection of "/" and "\" becomes larger when the servo head is positioned towards the bottom of marking "/ \" and smaller if the servo head positioned towards the top of marking "/ \". Given a constant velocity of magnetic tape, a defined time period between detected servo signals may correspond to a center of marking "/ \". By locating the center of marking "/ \", a known distance between the center of the servo track and the data tracks can be identified. Different servo tracks may be defined by different traverse locations along the marking "/ \".

A servo head that is able to read and/or write full band time-based servo marks includes servo gaps oriented parallel to the servo markings. A full band servo verify head is used to read back the entire width of the servo markings to detect flaws in the written servo signal. In time-based servo systems, part or all of the servo signal is recorded at an angle non-parallel to both the down tape and transverse directions of tape motion. The verification process for time-based servo markings requires servo read gaps to be oriented parallel to the directions of the servo markings. This is accomplished by orienting individual ferrite composite servo head cores using precision assembly and machining. The resultant servo head has high labor content and low yield, which makes this type of servo verify head expensive to manufacture.

SUMMARY

In general, the invention is directed to a thin film servo head apparatus that provides full band verification of time-based servo marks on a magnetic tape. The thin film servo head apparatus includes a plurality of thin film servo heads formed in a substrate. The substrate is canted such that servo gaps included in each of the plurality of thin film servo heads are substantially parallel to the time-based servo marks. Thin film servo verify heads eliminate the high labor, low yield machining process associated with conventional ferrite composite servo verify heads. Thin film servo heads may be fabricated in bulk on substrate wafers to reduce manufacturing time and cost.

It can be difficult or impossible to fabricate angled servo gaps for the thin film servo heads using conventional techniques. The invention described herein enables thin film servo heads to be used with time-based servo markings by defining a servo gap spacing such that when the substrate is canted, the servo gaps of the thin film servo heads substantially align with the time-based servo markings. For example, a servo gap spacing y may be defined according to the equation:

$$y = \frac{x}{\cos(\alpha)},$$

where x is a transverse distance between centers of adjacent servo bands on the magnetic tape and $\alpha$ is an angle at which the substrate is canted relative to a transverse direction of the magnetic tape.

In one embodiment, the invention is directed to a thin film servo head apparatus positioned in a transverse direction of a magnetic tape moving over the thin film servo head apparatus. The apparatus comprises a first thin film servo head and a second thin film servo head formed on a substrate. The first thin film servo head includes a first servo gap. The second thin film servo head includes a second servo gap substantially parallel to the first servo gap. The substrate is canted relative to the transverse direction of the magnetic tape such that the first and second servo gaps are non-parallel to the transverse direction.

In another embodiment, the invention is directed to a system comprising a magnetic tape and a thin film servo head apparatus. The magnetic tape comprises servo bands with servo marks oriented non-parallel to both a down tape direction and a transverse direction. The thin film servo head apparatus, positioned in the transverse direction of the magnetic tape moving over the thin film servo head apparatus, comprises a first thin film servo head and a second thin film servo head formed on a substrate. The first thin film servo head includes a first servo gap corresponding to a first servo band on the magnetic tape. The second thin film servo head includes a second servo gap substantially parallel to the first servo gap that corresponds to a second servo band on the magnetic tape. The substrate is canted relative to the transverse direction of the magnetic tape such that the first and second servo gaps are substantially parallel to at least a portion of the servo marks in the first and second servo bands.

In another embodiment, the invention is directed to a method of fabricating a thin film servo head apparatus to be positioned in a transverse direction of a magnetic tape moving over the thin film servo head apparatus. The method comprises forming at least two thin film servo heads on a substrate. Each of the thin film servo heads comprises a servo gap. The method further comprises canting the substrate relative to the transverse direction of the magnetic tape such that the servo gaps are non-parallel to the transverse direction.

Various aspects of the invention can provide a number of advantages. For example, the thin film servo head apparatus reduces manufacturing time and cost relative to the conventional ferrite composite servo head. Furthermore, the thin film servo apparatus may be used as a servo verify head to read back the entire width of a time-based servo pattern to detect gross flaws in the recorded servo signal.

In some cases, the thin film servo head apparatus comprises a planar surface, as opposed to a conventional servo head apparatus that typically includes a cylindrically contoured surface with servo gaps positioned along an apex of the cylindrical contour in order to make full contact with a magnetic tape. The canted substrate of the invention causes the servo gaps to misalign with an apex of a cylindrical contour. Thus, if a contoured surface is used, the servo gaps not located at the apex may not maintain contact with the magnetic tape. In accordance with the invention, however, a planar surface allows each servo gap in the canted substrate to maintain full contact with the magnetic tape moving over the thin film servo head apparatus. Therefore, the planar surface increases the ability of the servo gaps to accurately read the time-based servo marks. The thin film servo head apparatus described herein may be used to read or write servo marks, or to verify that servo marks have been accurately recorded on a medium.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
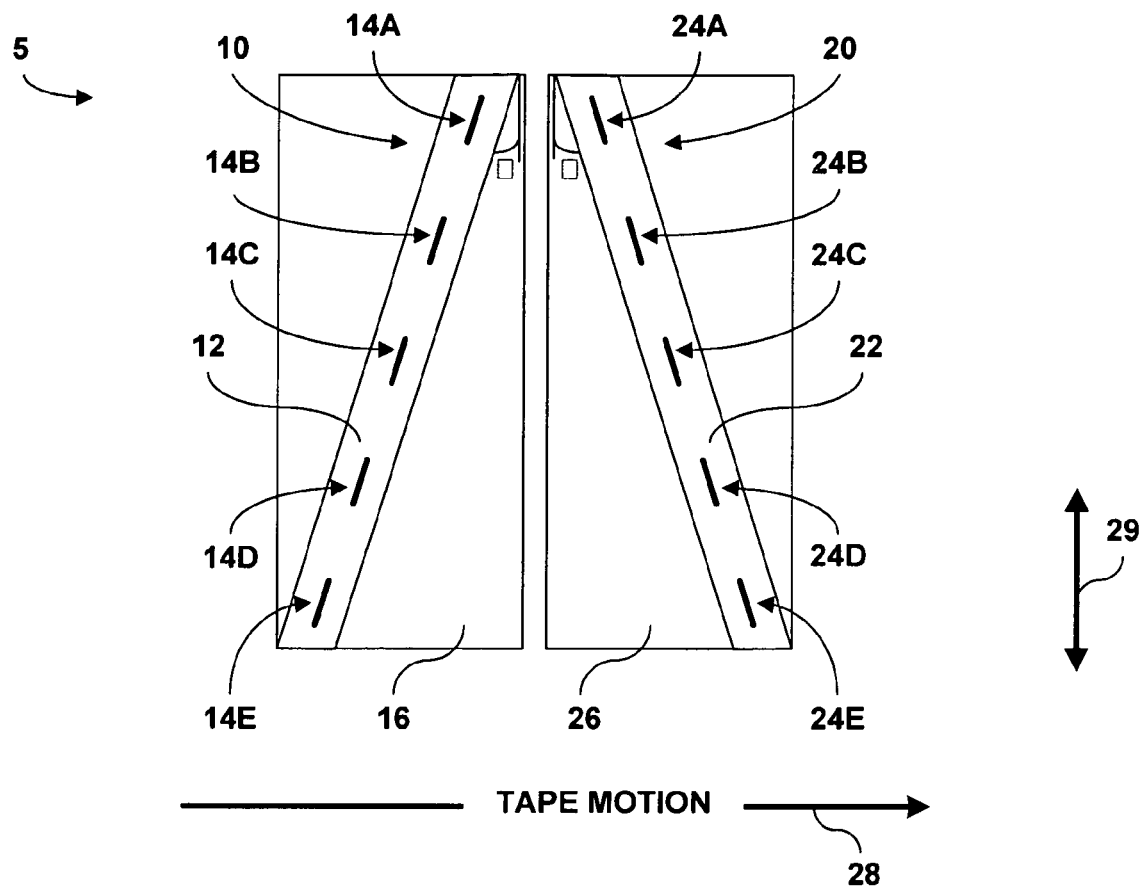
FIG. 1 is a schematic diagram illustrating a servo head assembly including a first thin film servo head apparatus and a second thin film servo head apparatus.

FIG. 1 is a schematic diagram illustrating a servo head assembly 5 including a first thin film servo head apparatus 10 and a second thin film servo head apparatus 20. First apparatus 10 includes a first substrate 12 and five servo gaps 14A–14E formed in first substrate 12. First substrate 12 is mounted in a first mounting structure 16. Second apparatus 20 includes a second substrate 22 and five servo gaps 24A–24E formed in second substrate 22. Second substrate 22 is mounted in a second mounting structure 26. In other embodiments, first and second substrates 12 and 22 may respectively include any number of servo gaps. In other embodiments, first and second substrates 12 and 22 are not necessarily mounted in mounting structures.

First and second apparatuses 10 and 20 are positioned in a transverse direction 29 of a magnetic tape moving over the apparatuses in a down tape direction 28. First substrate 12 is canted relative to transverse direction 29 such that servo gaps 14 are non-parallel to transverse direction 29. Second substrate 22 is canted relative to transverse direction 29 such that servo gaps 24 are non-parallel to transverse direction 29. Alternatively, the second substrate may be parallel to the traverse direction, and a third substrate could be used, e.g., for use with N-shaped servo patterns. In any case, second substrate 22 is positioned within mounting structure 26 to be non-parallel to first substrate 12. The substrates 12 and 22 may be canted to define an angle α with transverse direction 29. For N-shaped servo patterns, however, only one of the substrates would be canted, i.e., the substrate with the gaps corresponding to the hypotenuses of the N-shaped servo patterns.

First apparatus 10 and second apparatus 20 are substantially aligned to each other such that, for example, servo gaps 14A and 24A correspond to a first servo band on the magnetic tape passing over the apparatuses. Furthermore, servo gaps 14B–14E and 24B–24E respectively correspond a second, a third, a fourth, and a fifth servo band. The servo band may include time-based servo marks oriented non-parallel to both down tape direction 28 and transverse direction 29. Canting the first and second substrates 12 and 22 allows servo gaps 14 and 24 to be substantially parallel to at least a portion of the time-based servo marks regardless of the servo marks' orientation. Positioning the first and second substrates 12 and 22 to be non-parallel to each other enables reading of time-based servo patterns that include non-parallel servo marks. First and second apparatuses 10 and 20 may comprise servo verify apparatuses that read back the entire width of a servo pattern in each of the servo bands to detect flaws in the written servo signals.

Each of the five servo gaps 14A–14E is included in a servo head (not visible in FIG. 1). The servo heads are formed in first substrate 12 using a thin film fabrication process including photolithography and thin film deposition. Each of the servo heads comprises a core, such as a C-core, and a coil wound around the core. Each of the cores defines one of the servo gaps 14 corresponding to one of the servo heads. Each of the five servo gaps 24A–24E is included in a servo head (not visible in FIG. 1). The servo heads and corresponding servo gaps 24 are formed in a substantially similar thin film fabrication process as servo gaps 14. In some embodiments, the servo heads may be formed in bulk on a substrate wafer. In that case, first and second substrates 12 and 22 may comprise slices from the same substrate wafer.

During the thin film fabrication process, a servo gap spacing is defined to ensure accurate alignment of servo gaps 14 and 24 to the servo marks on the magnetic tape passing over the first and second apparatuses 10 and 20. The servo gap spacing is predefined such that when the substrate is canted by the angle α relative to transverse direction 29, the servo gaps substantially align with servo marks recorded in adjacent servo bands on the magnetic tape.

Due to canted first and second substrates 12 and 22, servo gaps 14 and 16 may not be able to maintain full contact with the magnetic tape if first and second apparatuses 10 and 20 comprise cylindrically contoured surfaces. In some embodiments, first and second apparatuses 10 and 20 comprise planar surfaces to increase the accuracy and reliability of the servo signals read from the magnetic tape.

Figure 2:
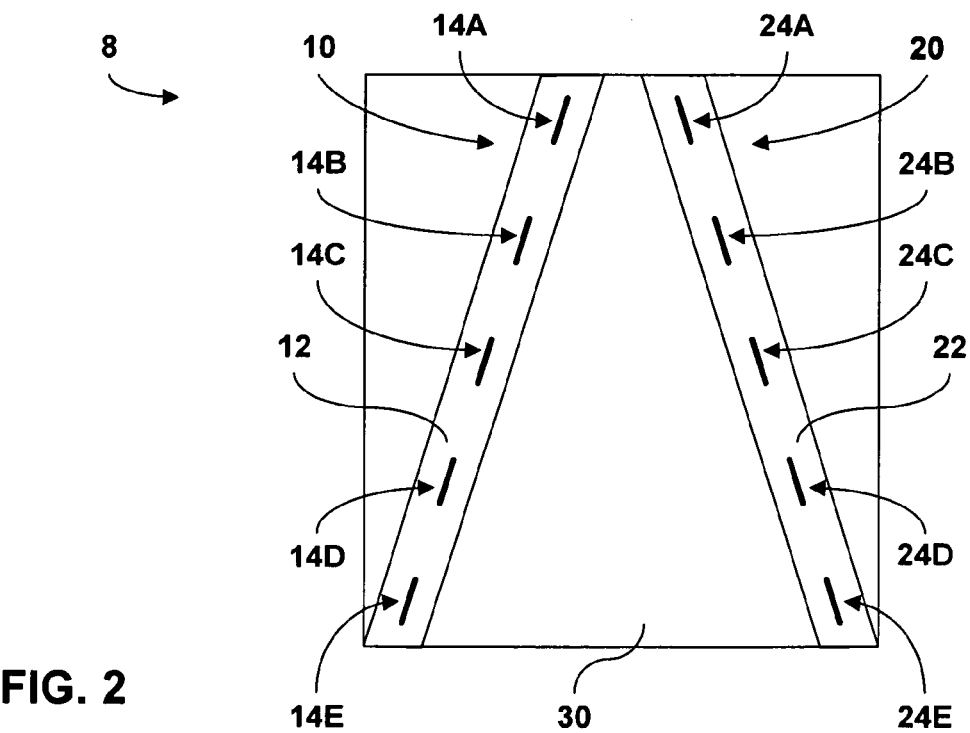
FIG. 2 is a schematic diagram illustrating another servo head assembly including the first thin film servo head apparatus and the second thin film servo head apparatus from FIG. 1.

FIG. 2 is a schematic diagram illustrating a servo head assembly 8 including first thin film servo head apparatus 10 and second thin film servo head apparatus 20 from FIG. 1. First substrate 12 and second substrate 22 are mounted in a mounting structure 30. First and second substrates 12 and 22 are canted and positioned as described in greater detail above. Mounting both substrates 12 and 22 in single mounting structure 30 allows servo gaps 14A–14E and servo gaps 24A–24E to accurately align to each other and to servo marks recorded in servo bands on the magnetic tape.

Figure 3:
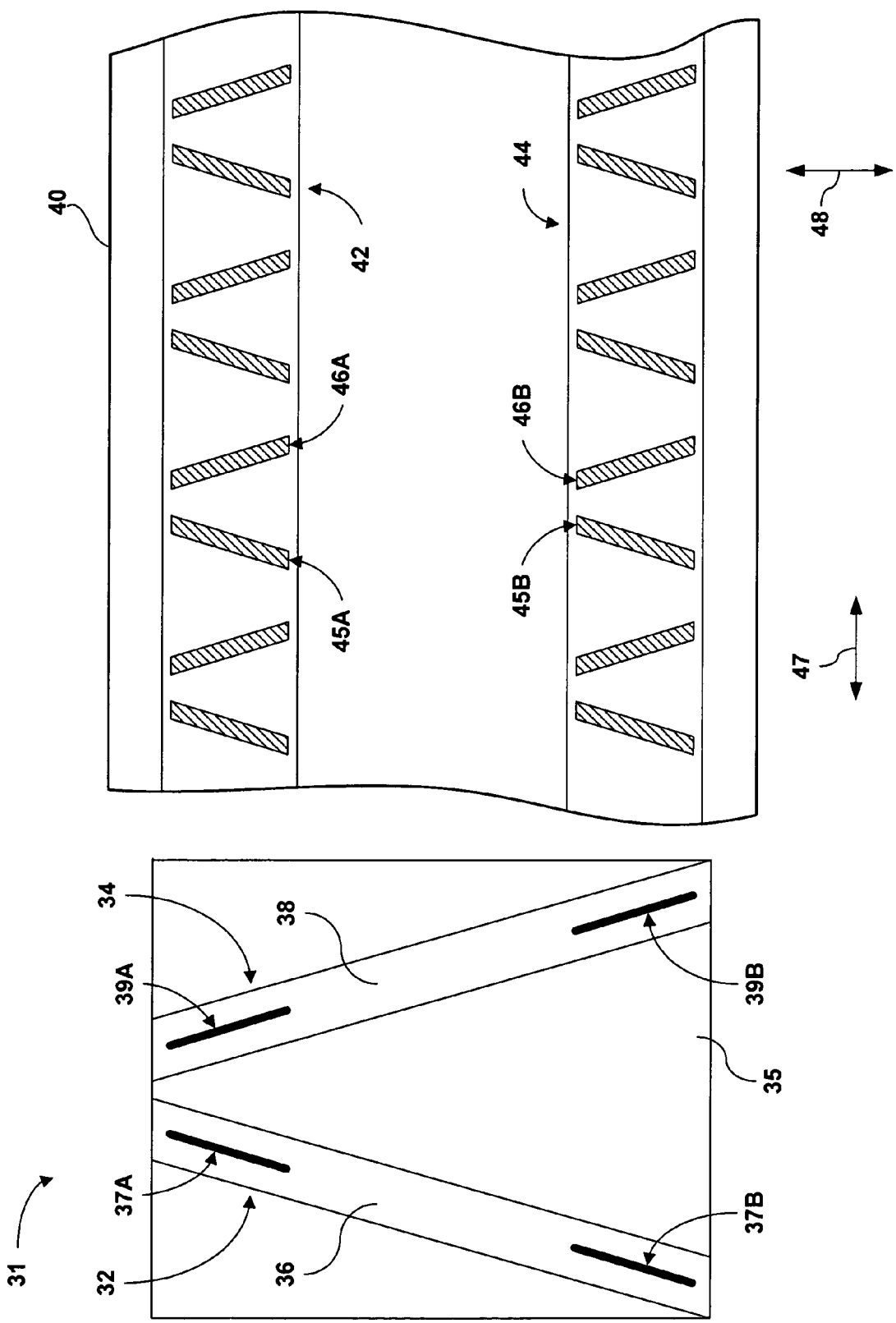
FIG. 3 is a schematic diagram illustrating a portion of a magnetic tape passing over a servo head assembly.

FIG. 3 is a schematic diagram illustrating a portion of a magnetic tape 40 passing over a servo head assembly 31. In particular, servo head assembly 31 includes a first thin film servo head apparatus 32 and a second thin film servo head apparatus 34. Apparatus 32 includes a first substrate 36 defining a first servo gap 37A and a second servo gap 37B. Apparatus 34 includes a second substrate 38 defining a third servo gap 39A and a fourth servo gap 39B. First and second substrates 36 and 38 are mounted in a single mounting structure 35, substantially similar to FIG. 2. Magnetic tape 40 includes a first servo band 42 and a second servo band 44. First servo band 42 includes servo marks 45A and 46A. Second servo band 44 includes servo marks 45B and 46B. First substrate 36 is canted to position first write gap 37A and second write gap 37B substantially parallel to the orientation of servo marks 45A and 45B respectively. Second substrate 38 is canted to position third write gap 39A and fourth write gap 39B substantially parallel to the orientation of servo marks 46A and 46B respectively.

Magnetic tape 40 moves over apparatuses 32 and 34 in a down tape direction 47. Apparatuses 32 and 34 may be positioned in a transverse direction 48 of magnetic tape 40 to align the servo gaps to the servo bands. First servo gap 37A and third servo gap 39A align to servo band 42 in order to accurately read servo marks 45A and 46A respectively. Additionally, second servo gap 37B and fourth servo gap 39B align to servo band 44 in order to accurately read servo marks 45B and 46B. In some embodiments, apparatuses 32 and 34 comprise planar surfaces to ensure servo gaps 37A, 37B and 39A, 39B maintain full contact with magnetic tape 40 as it passes over apparatuses 32 and 34.

Apparatuses 32, 34 may comprise servo verify apparatuses. For example, in the case of apparatus 32 comprising a servo verify apparatus, first servo gap 37A generates a signal from servo mark 45A in first servo band 42 on magnetic tape 40. The generated signal may be used to detect flaws in the recorded servo signal.

Figure 4:
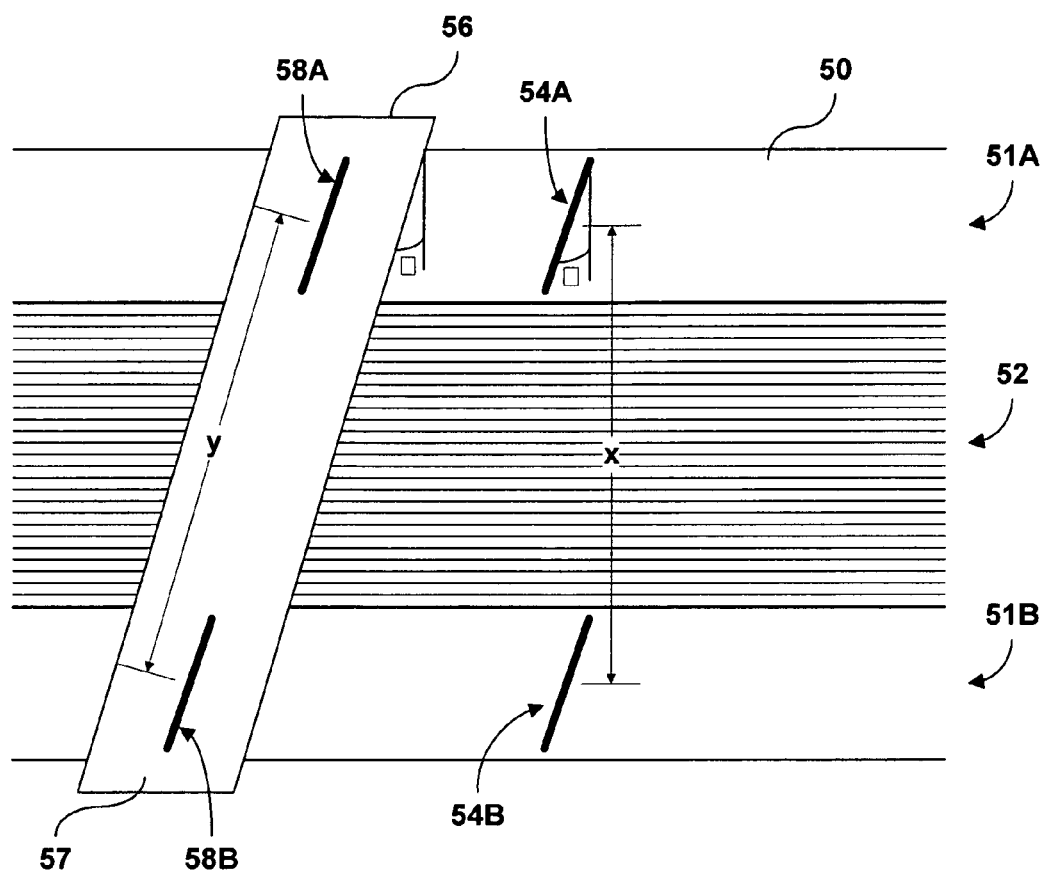
FIG. 4 is a schematic diagram illustrating a portion of a magnetic tape passing over a thin film servo head apparatus.

FIG. 4 is a schematic diagram illustrating a portion of a magnetic tape 50 passing over a thin film servo head apparatus 56. Magnetic tape 50 includes a first servo band 51A, a second servo band 51B, and a data band 52. Any number of data tracks may define data band 52. First servo band 51A includes a first servo mark 54A. Second servo band 51B includes a second servo mark 54B. Thin film servo head apparatus 56 is positioned in a transverse direction of magnetic tape 50, which moves over apparatus 56 in a down-tape direction. Thin film servo head apparatus 56 comprises a first servo gap 58A and a second servo gap 58B formed in a first servo head and a second servo head, respectively, on a substrate 57. In the illustrated embodiment, substrate 57 is not mounted in a mounting structure. In other embodiments, substrate 57 may be mounted in a mounting structure that defines edges substantially parallel to the transverse direction.

Substrate 57 is canted at an angle α with respect to the transverse direction of magnetic tape 50. Canting substrate 57 allows first and second servo gaps 58A and 58B to be substantially parallel to first servo mark 54A and second servo mark 54B. As can be seen in FIG. 4, first servo gap 58A corresponds to first servo band 51A to read first servo mark 54A. Second servo gap 58B corresponds to second servo band 51B to read second servo mark 54B. In order to achieve alignment between servo gaps on substrate 57 and servo bands on magnetic tape 50, a servo gap spacing is defined. Servo gap spacing, y, comprises a distance between first servo gap 58A and second servo gap 58B along a parallel axis of the canted substrate 57. The servo gap spacing is defined such that when substrate 57 is canted, the transverse distance between first and second servo gaps 58A and 58B is substantially equal to the transverse distance, x, between the centers of first servo band 51A and second servo band 51B. Servo gap spacing, y, can be determined from the following equation.

$$y = \frac{x}{\cos(\alpha)} \qquad (1)$$

During fabrication of the thin film servo head apparatus 56, the servo heads including servo gaps 58A and 58B are positioned on substrate 57 at a distance equal to the servo gap spacing, y. In that way, when substrate 57 is canted at angle α relative to the transverse direction, the first and second servo gaps 58A and 58B correspond to first and second servo bands 51A and 51B and are parallel to first and second servo marks 54A and 54B. The thin film servo head apparatus described herein may be used to read or write servo marks, or to verify that servo marks have been accurately recorded on a medium.

FIGS. 5–13 are schematic diagrams illustrating a manufacturing process of thin film servo heads and thin film servo head apparatuses, such as thin film servo head apparatuses 10 and 20 from FIGS. 1 and 2. It can be difficult or impossible to fabricate angled servo gaps for the thin film servo heads using conventional techniques. The invention described herein enables thin film servo heads to be used with time-based servo markings by defining a servo gap spacing such that when the substrate is canted, the servo gaps of the thin film servo heads substantially align with the time-based servo markings.

Figure 5:
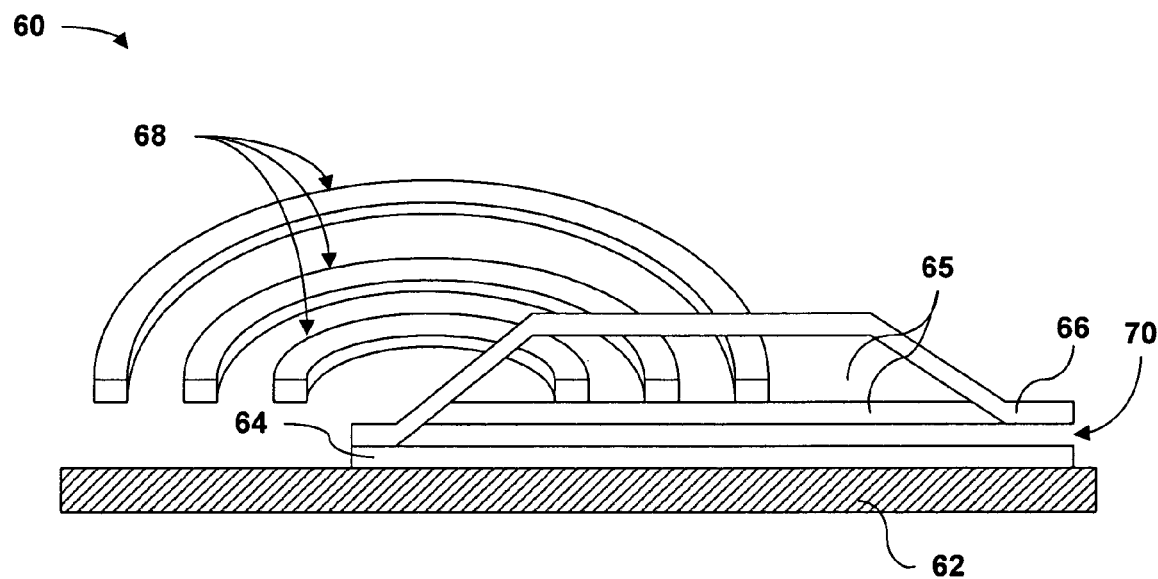
FIGS. 5–13 are schematic diagrams illustrating a manufacturing process of thin film servo heads and thin film servo head apparatuses.

FIG. 5 is a cross-sectional side view of a thin film servo head 60. Thin film servo head 60 is built on a substrate 62, which may be a non-magnetic ceramic substrate, using thin film deposition and photolithography techniques. Thin film servo head 60 includes a first magnetic film layer 64. The magnetic film may comprise a permalloy film, which is an easily magnetized and demagnetized 80/20 alloy of nickel and iron. A servo gap 70 is formed over first magnetic film layer 64 from, for example, a nonmagnetic amorphous alumina film. A coil 68 is then formed over servo gap 70 from a conductive metal, such as copper. A second magnetic film layer 66 is formed over coil 68. Second magnetic film layer 66 may also comprise a permalloy film. Servo gap 70 is etched away at the center of coil 68 to provide contact between the first magnetic film layer 64 and the second magnetic film layer 66. The first and second layers 64, 66 form a C-core. A hard-cured photoresist may be used to form insulation layers 65 between coil 68 and first and second magnetic film layers 64 and 66. Thin film servo head 60 may comprise a magnetoresistive element.

Figure 6:
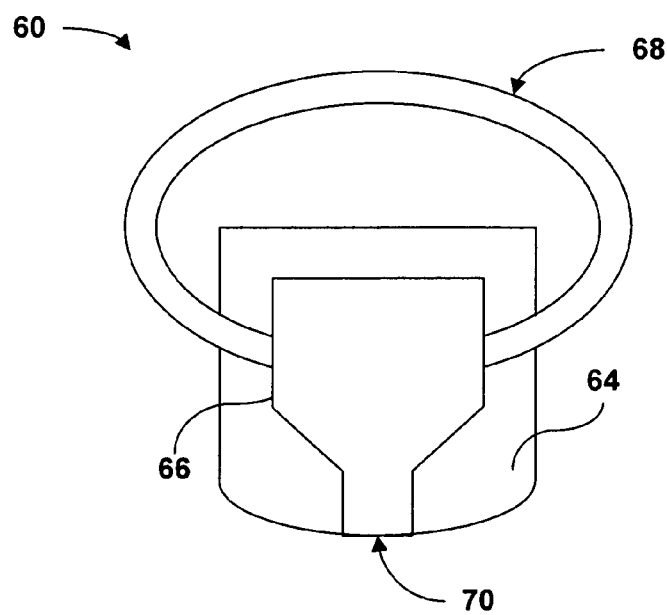

FIG. 6 is a top view of the thin film servo head 60 from FIG. 5. Thin film servo head 60 includes first magnetic film layer 64, and second magnetic film layer 66, coil 68 wound between first and second layers 64, 66, and servo gap 70. Thin film servo head 60 may comprise a servo verify head. In that case, servo gap 70 generates a signal when servo marks recorded in a servo band on the magnetic tape are detected. The generated signal may be used to detect flaws in the recorded servo signal.

Figure 7:
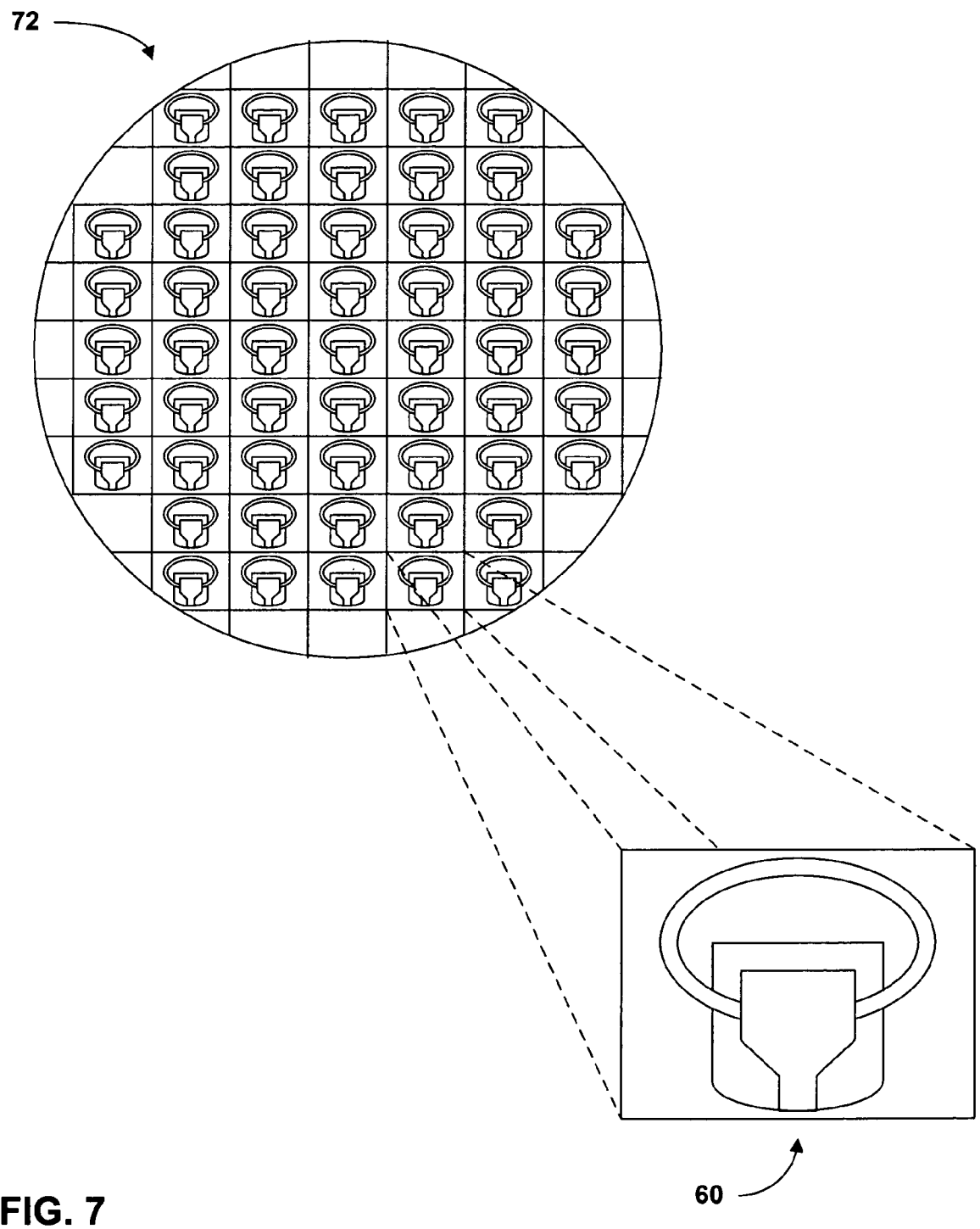

FIG. 7 is a top view of an example substrate wafer 72 including a plurality of thin film servo heads 60. For purposes of illustration, thin film servo heads 60 are drawn very large relative to wafer 72. In practice, a substrate wafer may include more than 100,000 thin film servo write heads. Each of the plurality of thin film servo heads 60 may comprise a magnetoresistive element and may be simultaneously fabricated as described in reference to FIG. 5. Forming the thin film servo heads 60 on wafer 72 includes separating servo heads 60 by a predefined servo gap spacing.

After the batch fabrication is complete, substrate wafer 72 may be cut into substrates containing two or more thin film servo heads. The servo gap spacing is predefined such that when the substrates are canted relative to a transverse direction of a magnetic tape, servo gaps 70 will substantially align with time-based servo marks in servo bands on the magnetic tape. Thin film servo head apparatuses, similar to those described above, may include the substrates cut from wafer 72.

As stated above, performing a batch fabrication may result in more than 100,000 servo write heads 60 formed on wafer 72. A single substrate wafer 72 may create a large number of thin film servo head apparatuses. Therefore, batch processing thin film servo heads 60 increases thin film servo head apparatus fabrication speed as well as decreases the cost of manufacturing.

Figure 8:
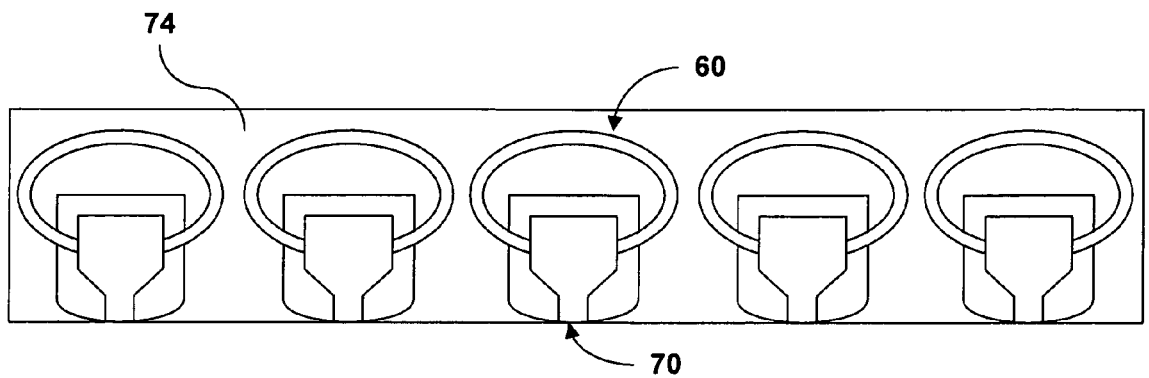

FIG. 8 is a top view of a substrate 74 including five thin film servo heads 60. Substrate 74 may be cut from substrate wafer 72 from FIG. 7. In the illustrated embodiment, substrate 74 comprises five thin film servo heads 60. In other embodiments, substrate 74 may comprise any number of thin film servo heads 60. Substrate 74 is cut such that servo gaps 70 of thin film servo heads 60 are adjacent an edge of substrate 74. In that way, servo gaps 70 are able to make contact with a magnetic tape. Therefore, substrate 74 may be used to create thin film servo head apparatuses, such as thin film servo apparatuses 10 and 20 from FIGS. 1 and 2.

Figure 9:
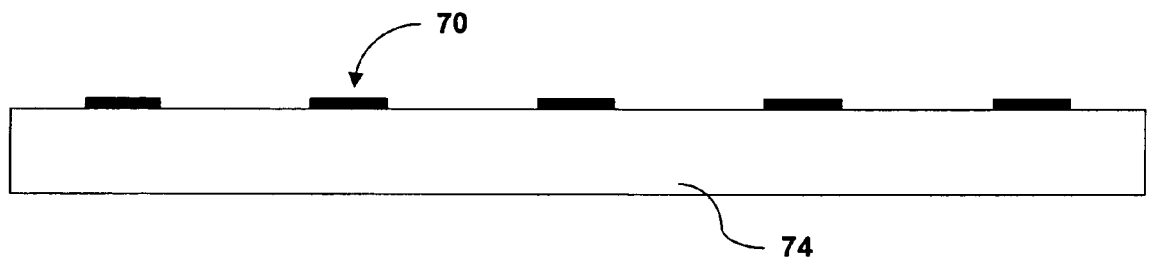

FIG. 9 is a side view of substrate 74 from FIG. 8. The five servo gaps 70 of the five thin film servo heads 60 are positioned adjacent an edge of substrate 74 and, protrude from substrate 74. Again, this allows servo gaps 70 access to a magnetic tape passing over the side of substrate 74.

Figure 10:
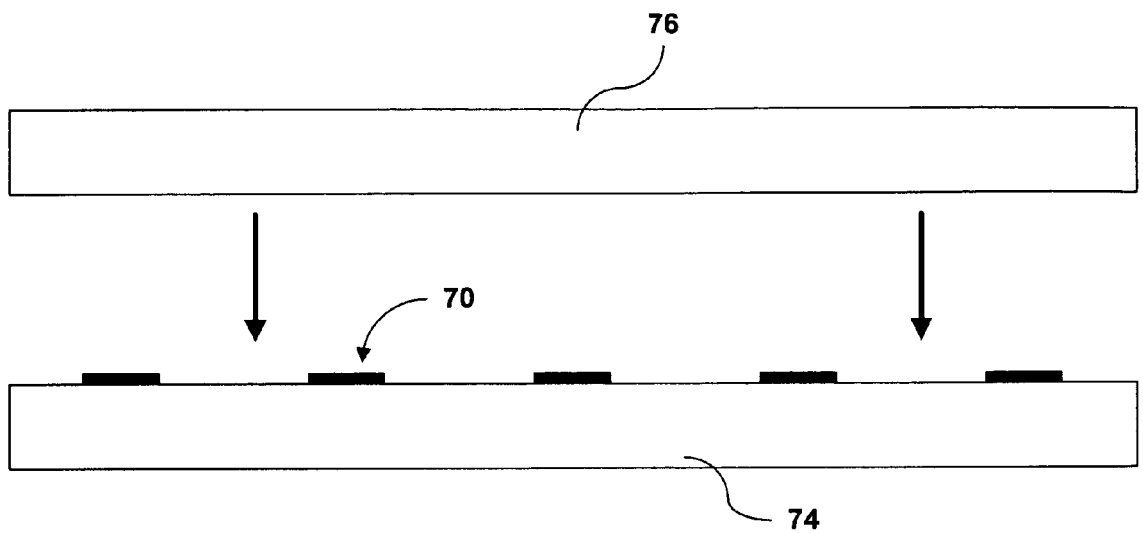

FIG 10 is a side view of a superstrate 76 being placed over substrate 74. Superstrate 76 may comprise a nonmagnetic ceramic superstrate substantially similar to substrate 74. Superstrate 76 protects thin film servo heads 60 (not visible in FIG. 10) from damage due to exposure to dust, debris, and magnetic fields while allowing servo gaps 70 to make contact with a passing magnetic tape.

Figure 11:
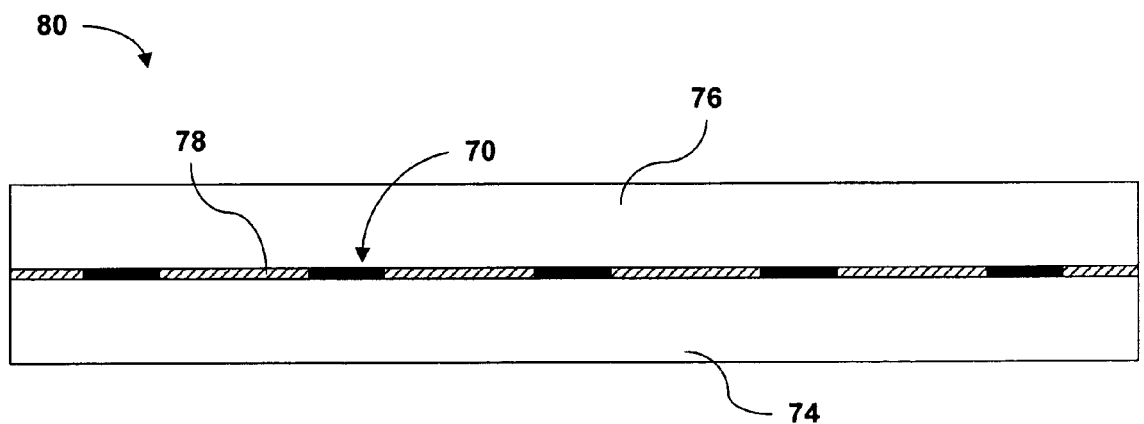

FIG. 11 is a side view of a thin film servo head apparatus 80. Apparatus 80 comprises substrate 74 including five servo gaps 70, superstrate 76 placed over substrate 74, and an insulator 78 (such as aluminum oxide) between the five servo gaps 70. Oxide 78 is included between the servo gaps 70 to smooth over a surface of thin film servo head apparatus 80. Servo gaps 70 remain exposed such that thin film servo heads 60 (not visible in FIG. 11) may read servo patterns on a magnetic tape passing over apparatus 80.

Figure 12:
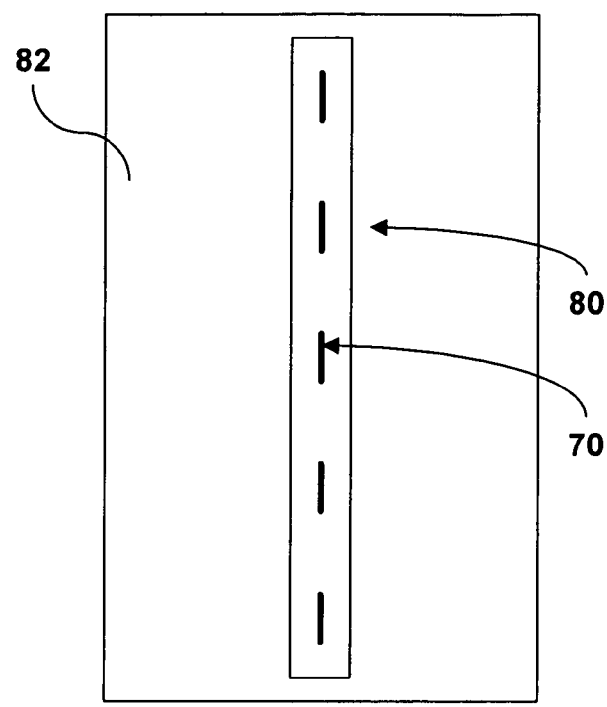
Figure 13:
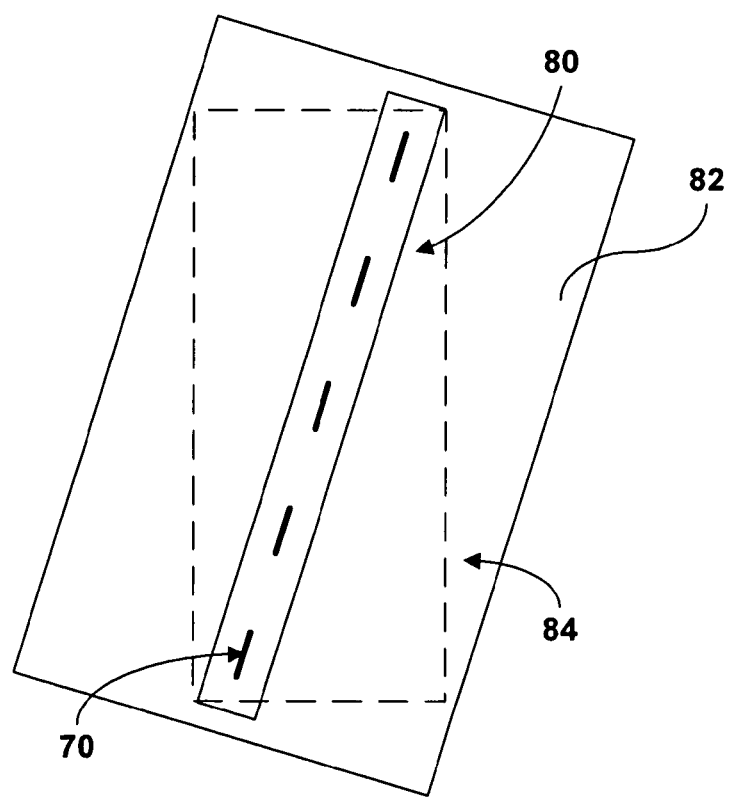

FIG. 12 is a schematic diagram illustrating thin film servo head apparatus 80 mounted in a pre-mounting structure 82. FIG. 13 is a schematic diagram illustrating thin film servo head apparatus 80 canted relative to a transverse direction. Apparatus 80 and pre-mounting structure 82 are canted until apparatus 80 defines a specific angle relative to a transverse direction of a magnetic tape. The angle is determined such that servo gaps 70 substantially align with time-based servo marks in servo bands on a magnetic tape. Pre-mounting structure 82 is then cut to define a mounting structure 84 with edges parallel to the transverse direction. In the illustrated embodiment, apparatus 80 is first mounted parallel to the transverse direction in a pre-mounting structure 82. In other embodiments, apparatus 80 is canted prior to being mounted in a mounting structure. Mounting structures may comprise ceramic mounting structures.

Figure 14:
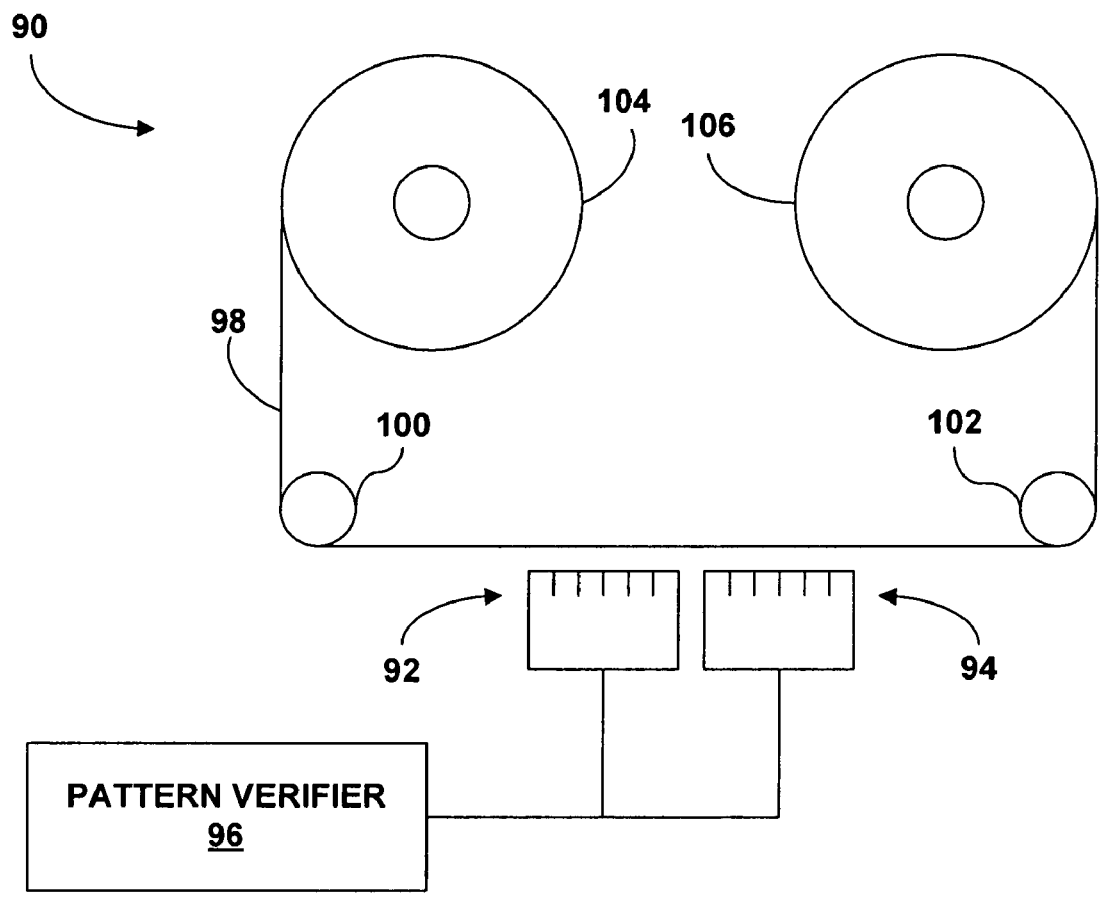
FIG. 14 illustrates an exemplary servo verify system for verifying servo patterns on a magnetic tape with thin film servo head apparatuses.

FIG. 14 illustrates an exemplary servo verify system 90 for verifying servo patterns on a magnetic tape 98 with thin film servo head apparatuses as described herein. Servo system 90 includes a first thin film servo head apparatus 92, a second thin film servo head apparatus 94, a pattern verifier 96, and magnetic tape 98 spooled on spools 104 and 106. Magnetic tape 98 feeds from spool 104 to spool 106 along guides 100 and 102, passing in close proximity to first and second apparatuses 92, 94. For example, magnetic tape 98 may contact apparatuses 92, 94 during recording.

Each of thin film servo head apparatuses 92, 94 comprise a substrate including five thin film servo heads defining five servo gaps. In other embodiments, apparatuses 92 and 94 may comprise two or more servo gaps, i.e., any plurality of servo gaps. The substrates in each of apparatuses 92 and 94 may be canted in differing direction, substantially similar to thin film servo head apparatuses 10 and 20, respectively, from FIGS. 1 and 2. In that way, time-based servo patterns that include oppositely oriented servo marks may be read by servo system 90. First and second apparatuses 92, 94 may comprise planar surfaces to ensure each of the five servo gaps maintains full contact with magnetic tape 98.

As magnetic tape 98 passes over thin film servo head apparatuses 92 and 94, the servo gaps within apparatuses 92 and 94 detect time-based servo marks recorded on magnetic tape 98. The thin film servo heads generate signals as functions of the detected time-based servo marks. The signals generated by the thin film servo heads may be in the form of a current or a voltage. Pattern verifier 96 analyzes the generated signals to determine if each of the servo marks has the proper qualities, such as pattern, position, amplitude, dropout rate and consistency with other marks. If pattern verifier 96 detects an unacceptable servo mark, pattern verifier 96 may note the error, and/or may initiate action to mark the unacceptable portions of magnetic tape 98.

Conventional servo head apparatuses typically include a cylindrical contour along which servo gaps are positioned. In that case, each servo gap is located at the apex of the cylindrical contour in order to make full contact with a magnetic tape. The invention described herein includes thin film servo gaps positioned along a canted substrate. The canted substrate causes the servo gaps to misalign with the apex of the cylindrical contour. Servo gaps not located at the apex are not able to maintain contact with the magnetic tape.

As an alternative, the substrate may be co-linear with the cylindrical contour and the axis of the cylinder can be canted such that the servo gaps are substantially parallel to servo marks on the magnetic tape. In that way, each of the servo gaps is located at the apex of the cylindrical contour. However, the canted cylindrical contour causes the tape path to distort, which creates non-uniform tension and stress across the magnetic tape.

Figure 15:
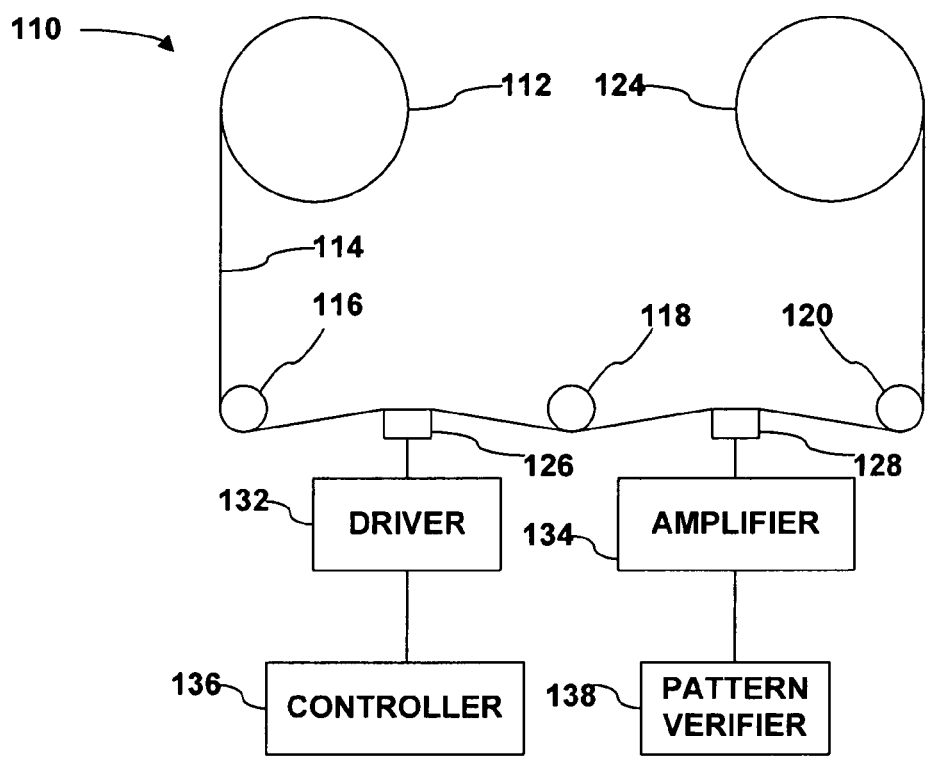
FIG. 15 is a schematic diagram illustrating an exemplary servo system for recording and verifying time-based servo patterns on a magnetic tape.

FIG. 15 is a schematic diagram illustrating an exemplary servo system 110 for recording and verifying time-based servo patterns on a magnetic tape 114. Time-based servo marks are used by a servo read head to determine the position of the servo read head and associated write/read transducer heads. Time-based servo marks usually comprise two or more servo lines angularly offset from one another. When the servo read head reads a time-based servo mark, the servo read head generates a pulse. Because the servo lines are angularly offset from one another, the timing between pulses is indicative of the location of the servo read head relative to the servo mark. The timing of the position signal pulses varies continuously as the servo read head is moved across the width of the servo mark.

Magnetic tape 114 dispenses from a spool 112 and passes by a recording head 126, which records the servo marks. Tape 114 then passes by a thin film servo verify head 128, which reads the servo marks for purposes of verification. In this manner, servo marks can be recorded and verified in a single pass of magnetic tape 114. Tape 114 is taken up by a spool 124. If an error in the servo marks is detected, the error may be noted so that portions of the medium having poor quality marks can be easily identified at a later time.

Guides 116, 118 and 120 steer magnetic tape 114 past heads 126 and 128. Guides 116, 118 and 120 and capstans and vacuum columns (not shown in FIG. 1) may also measure and regulate the speed and tension of tape 114 as tape 114 passes heads 126 and 128.

Recording head 126 may include a ferromagnetic C-shaped core wrapped with a wire coil. When current flows through the coil, magnetic flux flows through the core and a magnetic field forms. The field penetrates tape 114 as tape 114 passes the head, resulting in residual magnetization of tape 114. Tape 114 magnetically records the effect of the flux and the magnetic field. In other embodiments, recording head 126 may comprise a thin film servo head.

A driver 132 causes current to flow in the coil, thereby energizing recording head 126 and generating the magnetic field. Driver may, for example, send pulses of current to recording head 126, energizing recording head 126 with each pulse. A controller 136 regulates driver 132 by, for example, regulating the timing and intensity of the current pulses.

After recording head 126 writes a time-based servo mark to tape 114, tape 114 advances past thin film servo verify head 128. Verify head 128 detects the servo mark and generates a signal as a function of the detection. The signal generated by verify head 128 may be in the form of a current or a voltage. An amplifier 134 amplifies the signal and passes the amplified signal to a pattern verifier 138. Amplifier 134 may also change a current signal to an amplified voltage signal or a voltage signal to an amplified current signal.

Pattern verifier 138 analyzes the amplified signal to determine if the servo mark has the proper qualities, such as pattern, position, amplitude, dropout rate and consistency with other marks. If pattern verifier 138 detects an unacceptable servo mark, pattern verifier 138 may note the error, and/or may initiate action to mark the unacceptable portions of tape 114.

A system similar to system 110 may be used for recording and verifying servo marks on magnetic disks. In particular, a system adapted to magnetic disks may include a recording head, a verify head, a driver, a controller, an amplifier and a pattern verifier. The apparatus used to hold the disk and to move the medium relative to the heads, however, may be different.

Various embodiments of the invention have been described. For example, a thin film servo head apparatus has been described that enables thin film servo heads to read time-based servo marks on a magnetic tape. As described above, the thin film servo head apparatus may be a servo verify head apparatus used to verify time-based servo patterns recorded on the magnetic tape. The thin film servo heads are formed on a substrate separated by a predetermined servo gap spacing. The substrate is canted relative to a transverse direction of the magnetic tape such that servo gaps of the thin film servo heads align with servo bands on the magnetic tape and are substantially parallel to the time-based servo marks in the servo bands. In addition, the thin film servo head apparatus may include a planar surface so that servo gaps along the canted substrate can maintain full contact with the magnetic tape. The thin film servo head apparatus described herein may be used to read or write servo marks, or to verify that servo marks have been accurately recorded on a medium.

Nevertheless, various modifications may be made without departing from the scope of the invention. For example, the time-based servo patterns described above have generally included two differently angled lines, but any servo pattern may be used as long as the servo gaps are substantially parallel to at least a portion of the servo marks. Furthermore, although the thin film servo head apparatuses are generally described above as including five thin film servo heads, the thin film servo head apparatuses may include two or more thin film servo heads.

In addition, the thin film servo head apparatus may be a servo write head apparatus. A magnetic field may be generated across the servo gaps by a magnetic flux flowing through first and second magnetic film layers that comprise the core of each of the thin film servo heads. The magnetic flux is generated by currents flowing through coils wound around each of the cores. The magnetic field may be pulsed as a magnetic tape passes over the thin film servo head apparatus to record time-based servo marks in servo bands on the magnetic tape.

In the case of the thin film servo head apparatus comprising a servo write head apparatus, each of the thin film servo heads within the apparatus may be pulsed simultaneously or individually. In any case, the servo head apparatus described herein may find use in writing servo patterns, in addition to verifying recorded signals as outlined above. In some cases, one or more of the thin film servo heads may comprise a magnetoresistive element.

Although the thin film servo head apparatus described above has primarily been described in the context of servo patterns in which each set of gaps defines "/ \," or the like, similar structures could be defined for N-shaped servo patterns. For N-shaped servo patterns, however, three substrates may be used, and only one of the substrates would be canted, i.e., the substrate with the gaps corresponding to the hypotenuses of the N-shaped servo patterns. In other words a first substrate could include gaps parallel to the traverse direction, the second substrate could include canted gaps as described herein, and an optional third substrate could include gaps parallel to the traverse direction.

Figure 16:
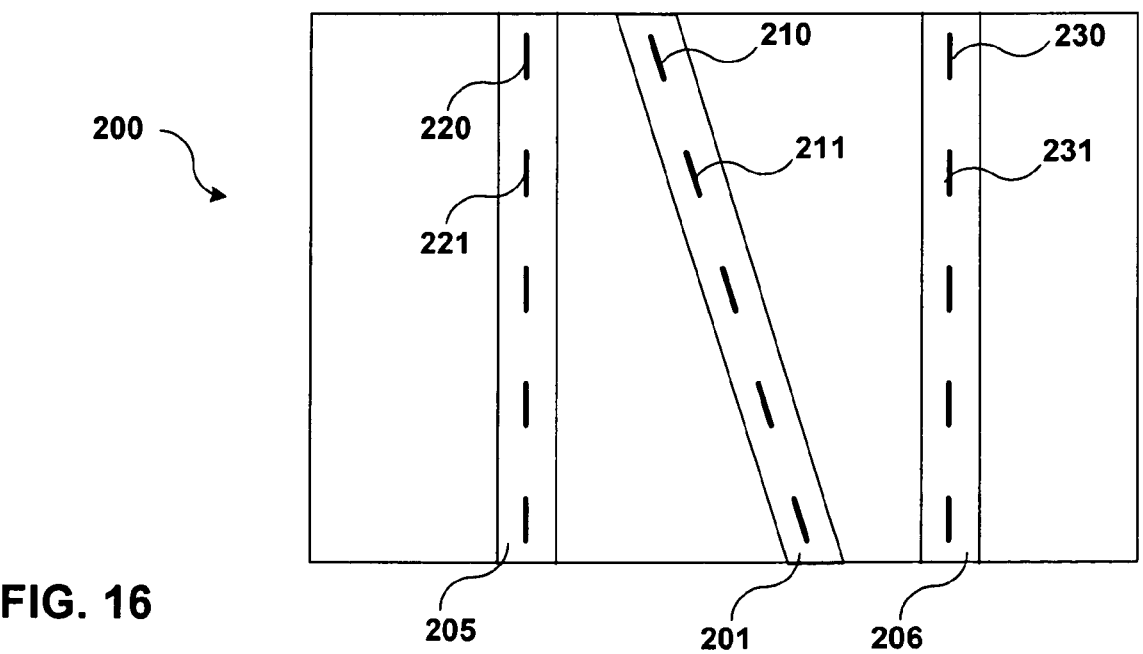
FIG. 16 is schematic diagram illustrating a servo head assembly according to an embodiment of the invention.

For example, as shown in FIG. 16, for N-shaped servo patterns, the invention may comprise a thin film servo head apparatus 200 positioned in a transverse direction of a magnetic tape moving over the thin film servo head apparatus 200, the apparatus 200 comprising a first thin film servo head 210 formed on a first substrate 201, the first thin film servo head 210 including a first servo gap, and a second thin film servo head 211 formed on the first substrate 201, the second thin film servo head 211 including a second servo gap substantially parallel to the first servo gap, and wherein the first substrate 201 is canted relative to the transverse direction of the magnetic tape such that the first and second servo gaps are non-parallel to the transverse direction. Moreover, for N-shaped servo patterns, or the like, the apparatus 200 may further comprise a third thin film servo head 220 or 230 formed on a second substrate 205 or 206 and comprising a third servo gap corresponding to the first servo band on the magnetic tape, and a fourth thin film servo head 221 or 231 formed on the second substrate 205 or 206 and comprising a fourth servo gap substantially parallel to the third servo gap and corresponding to the second servo band on the magnetic tape, and wherein the second substrate 205 or 206 is non-canted relative to the transverse direction of the magnetic tape and positioned parallel to the traverse direction. In that case, the first substrate 201 would define the gaps which correspond to the hypotenuses ("\") of the N-shaped patterns and the second substrate 205 or 206 would define the gaps which correspond to either the leading or trailing parallel gaps ("|") of the N-shaped patterns. These and other embodiments are within the scope of the following claims.

The invention claimed is:

1. A thin film servo head apparatus positioned in a transverse direction of a magnetic tape moving over the thin film servo head apparatus, the apparatus comprising:
   a first thin film servo head formed on a substrate, the first thin film servo head including a first servo gap; and
   a second thin film servo head formed on the substrate, the second thin film servo head including a second servo gap substantially parallel to the first servo gap, and wherein the substrate is canted relative to the transverse direction of the magnetic tape such that the first and second servo gaps are non-parallel to the transverse direction, wherein the substrate is canted at an angle α with the transverse direction of the magnetic tape and the substrate comprises a servo gap spacing y between the first servo gap and the second servo gap according to the equation:

$$y = \frac{x}{\cos(\alpha)},$$

wherein x is a transverse distance between centers of adjacent servo bands on the magnetic tape.

2. The apparatus of claim 1, wherein the first servo gap corresponds to a first time-based servo band on the magnetic tape and the second servo gap corresponds to a second time-based servo band on the magnetic tape, and wherein each of the first and second thin film servo heads comprise servo verify heads used to verify time-based servo marks recorded in the first and second time-based servo bands.

3. The apparatus of claim 1, further comprising a third thin film servo head formed on the substrate, the third thin film servo head including a third servo gap substantially parallel to the first and second servo gaps.

4. The apparatus of claim 1, wherein the substrate comprises a planar surface.

5. The apparatus of claim 1, wherein the substrate is canted such that the first and second servo gaps are substantially parallel to time-based servo marks recorded in servo bands on the magnetic tape.

6. The apparatus of claim 1, wherein the substrate is mounted in a mounting structure.

7. The apparatus of claim 1, wherein each of the first and second thin film servo heads comprise a core and a coil.

8. The apparatus of claim 1, wherein each of the first and second thin film servo heads include a plurality of servo gaps.

9. A system comprising:
   a magnetic tape comprising servo bands with servo marks oriented non-parallel to both a down tape direction and a transverse direction; and
   a thin film servo head apparatus positioned in the transverse direction of the magnetic tape moving over the thin film servo head apparatus, the apparatus comprising:
      a first thin film servo head formed on a substrate and including a first servo gap corresponding to a first servo band on the magnetic tape, and a second thin film servo head formed on the substrate and including a second servo gap substantially parallel to the first servo gap and corresponding to a second servo band on the magnetic tape, and wherein the substrate is canted relative to the transverse direction of the magnetic tape such that the first and second servo gaps are substantially parallel to at least a portion of the servo marks in the first and second servo bands, wherein the substrate is canted at an angle α with the transverse direction of the magnetic tape and the substrate comprises a servo gap spacing y between the first servo gap and the second servo gap according to the equation:

$$y = \frac{x}{\cos(\alpha)},$$

wherein x is a transverse distance between centers of adjacent servo bands on the magnetic tape.

10. The system of claim 9, wherein the first and second thin film servo heads comprise servo verify heads used to verify time-based servo marks recorded on the magnetic tape.

11. The system of claim 9, wherein the servo marks of the first and second servo bands are time-based servo marks.

12. The system of claim 9, further comprising a third thin film servo head formed on the substrate, the third thin film servo head including a third servo gap substantially parallel to the first and second servo gaps and corresponding to a third servo band on the magnetic tape.

13. The system of claim 9, wherein the substrate is mounted in a mounting structure.

14. The system of claim 9, wherein the apparatus is a first apparatus and the substrate is a first substrate, the system further comprising a second thin film servo head apparatus comprising:
a third thin film servo head formed on a second substrate and comprising a third servo gap corresponding to the first servo band on the magnetic tape, and
a fourth thin film servo head formed on the second substrate and comprising a fourth servo gap substantially parallel to the third servo gap and corresponding to the second servo band on the magnetic tape, and wherein the second substrate is canted relative to the transverse direction of the magnetic tape and positioned non-parallel to the first substrate such that the third and fourth servo gaps are substantially parallel to at least a portion of the servo marks in the first and second servo bands.

15. The system of claim 14, wherein the first substrate and the second substrate are mounted in a mounting structure.

16. The system of claim 9, wherein the apparatus is a first apparatus and the substrate is a first substrate, the system further comprising a second thin film servo head apparatus comprising:
a third thin film servo head formed on a second substrate and comprising a third servo gap corresponding to the first servo band on the magnetic tape, and
a fourth thin film servo head formed on the second substrate and comprising a fourth servo gap substantially parallel to the third servo gap and corresponding to the second servo band on the magnetic tape, and wherein the second substrate is non-canted relative to the transverse direction of the magnetic tape and positioned parallel to the traverse direction.

17. A method of fabricating a thin film servo head apparatus to be positioned in a transverse direction of a magnetic tape moving over the thin film servo head apparatus, the method comprising:
forming at least two thin film servo heads on a substrate, wherein each of the thin film servo heads comprises a servo gap; and
canting the substrate relative to the transverse direction of the magnetic tape such that the servo gaps are non-parallel to the transverse direction, wherein canting the substrate comprises positioning the substrate at an angle α with the transverse direction of the magnetic tape and wherein forming the thin film servo heads comprises defining a servo gap spacing y according to the equation:

$$y = \frac{x}{\cos(\alpha)},$$

wherein x is a transverse distance between centers of adjacent servo bands on the magnetic tape.

18. The method of claim 17, further comprising mounting the substrate in a mounting structure, canting the mounting structure relative to the transverse direction of the magnetic tape, and cutting the mounting structure to form edges substantially parallel to the transverse direction of the magnetic tape.

* * * * *

UNITED STATES PATENT AND TRADEMARK OFFICE
CERTIFICATE OF CORRECTION

PATENT NO. : 7,206,170 B2
APPLICATION NO. : 10/848843
DATED : April 17, 2007
INVENTOR(S) : Yung Yip It is certified that error appears in the above-identified patent and that said Letters Patent is hereby corrected as shown below:

Title Page
Item (73), "Imetion Corp." should read --Imation Corp.--.

Signed and Sealed this

Twenty-ninth Day of July, 2008

JON W. DUDAS
*Director of the United States Patent and Trademark Office*